United States Patent
Land et al.

[11] 3,797,915
[45] Mar. 19, 1974

[54] BINOCULAR RANGEFINDER-VIEWFINDER WITH FRESNEL OPTICS

[75] Inventors: Edwin H. Land, Cambridge; Philip Norris, North Reading, both of Mass.

[73] Assignee: Polaroid Corporation, Cambridge, Mass.

[22] Filed: Sept. 25, 1972

[21] Appl. No.: 291,558

Related U.S. Application Data
[62] Division of Ser. No. 108,084, Jan. 20, 1971, Pat. No. 3,719,422.

[52] U.S. Cl............... 350/211, 350/201, 350/292
[51] Int. Cl. .............................. G02b 3/08
[58] Field of Search........................ 350/211, 194

[56] References Cited
UNITED STATES PATENTS
2,914,997   12/1959   Grey ...................... 350/211 UX
3,004,470   10/1961   Ruhle..................... 350/211 X
3,609,585   9/1971   Hufnagel................. 350/211 UX FOREIGN PATENTS OR APPLICATIONS
1,154,360   6/1969   Great Britain............. 350/211

*Primary Examiner*—John K. Corbin

[57] ABSTRACT

This disclosure depicts a number of novel Fresnel imaging structures incorporated in photographic rangefinding and viewfinding means. Each Fresnel imaging structure is both focal and afocal for simultaneously providing a view of a selected field and for projecting into the field a virtual image of a rangefinding or framing reticle.

2 Claims, 7 Drawing Figures

3,797,915

BINOCULAR RANGEFINDER-VIEWFINDER WITH FRESNEL OPTICS

CROSS REFERENCE TO RELATED APPLICATION:

This application is a division of U.S. Pat. application Ser. No. 108,084 filed Jan. 20, 1971, now U.S. Pat. No. 3,719,422. That application relates to, and was copending with, an application of Philip R. Norris, Ser. No. 37,667, filed May 15, 1970, now U.S. Pat. No. 3,661,064 and assigned to the assignee of the present invention.

BACKGROUND OF THE INVENTION

This application relates to novel Fresnel imaging means and to optical apparatus in which such Fresnel imaging means are particularly useful.

In photographic viewfinders of the "infinity" type in which a virtual image of an illuminated reticle is projected to infinity by the use of an imaging element, a view of the field must also be provided. The same requirement exists for rangefinders of the type in which a virtual image of a reticle is projected predetermined distances into a viewed field to serve as a visual reference against which the distance of objects in the field can be compared.

OBJECTS OF THE INVENTION

It is an object of this invention to provide novel Fresnel imaging means which are both focal and afocal and which are therefore extremely useful in applications wherein it is described that a single structure both focus a certain amount or pattern of light while passing other light substantially without a focusing effect.

It is another object to provide novel Fresnel imaging structures which are useful in rangefinders and viewfinders of the projected reticle image types.

It is still another object to provide improved photographic rangefinding and viewfinding structures incorporating such Fresnel imaging means.

It is yet another object of this invention to provide improved photographic rangefinding and viewfinding structures of the projected reticle image types which have imaging means which are by comparison with the prior art, relatively compact and which, in certain embodiments, provide an unusually bright field.

Further objects and advantages of the invention will in part by obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

Figure 1:
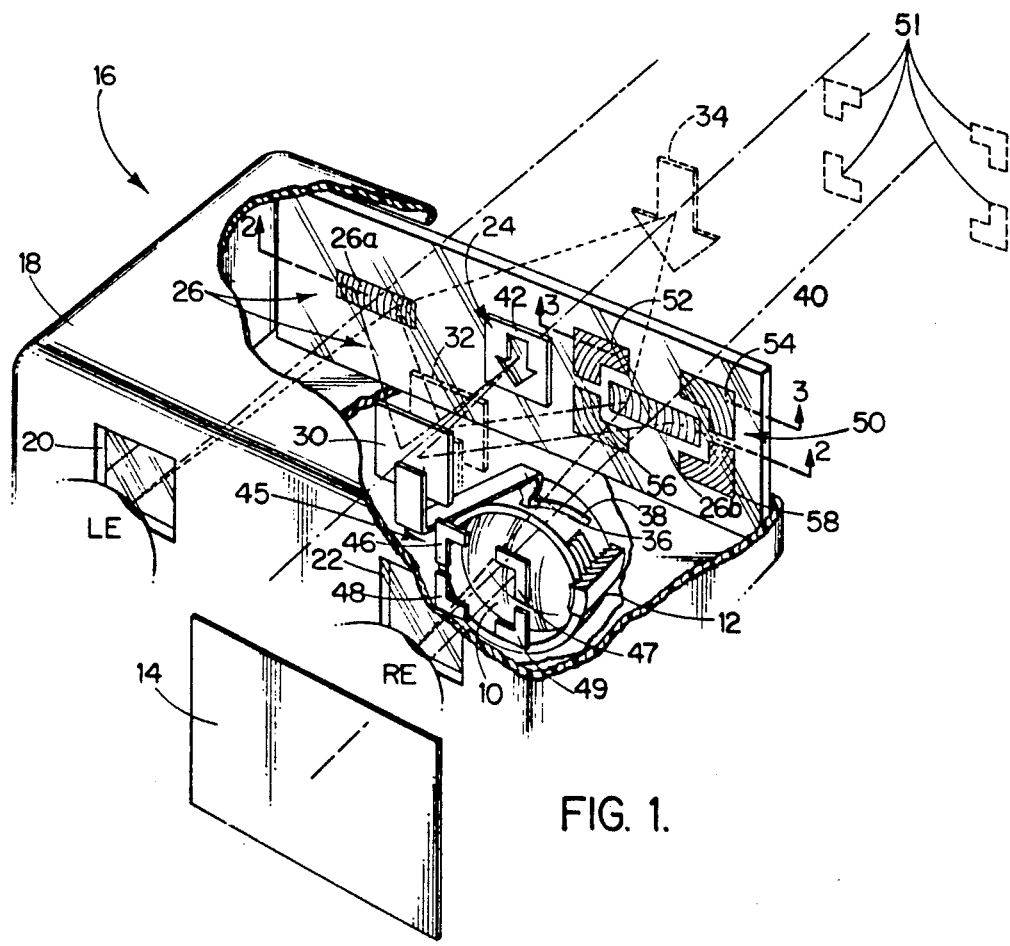
FIG. 1 is a highly schematic fragmentary perspective view of a photographic camera including a combination rangefinder-viewfinder embodying the principles of this invention.
Figure 2:
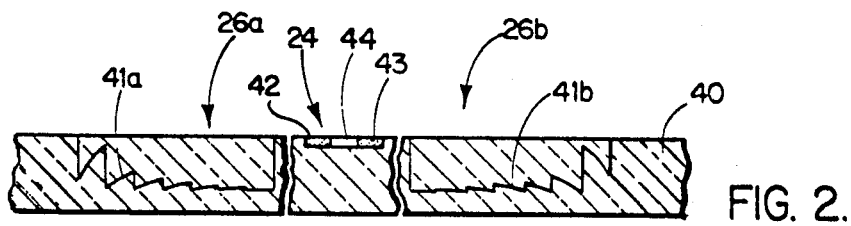
FIGS. 2 and 3 are sectional views taken along lines 2—2 and 3—3 in FIG. 1.
Figure 3:
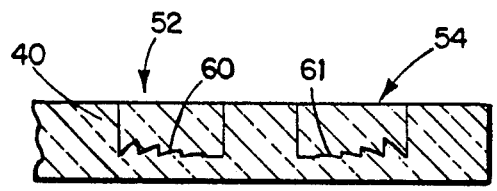

FIGS. 1-3 illustrate a preferred implementation of the principles of this invention in a rangefinder-viewfinder for a photographic camera.

FIG. 1 shows, in extremely schematic form, elements of a photographic camera including an objective lens 10 mounted in a rotatable lens turret 12. The turret 12 is shown as being of a type wherein rotation of the turret provides focus control by effecting an axial movement of the turret 12 and thus of the lens 10. In the illustrated embodiment, counterclockwise rotation (in FIG. 1) of the turret 12 causes the turret 12 and lens 10 to move forwardly (to focus an objects closer to the camera).

The objective lens 10 forms an image of the scene to be photographed on an element of photosensitive material 14. Means for controlling the exposure interval and effective aperture of the lens 10 are not shown, but may be of any suitable commercially available construction.

A novel rangefinder-viewfinder 16 according to this invention is shown as comprising a housing 18 having a left eye window 20 and a right eye window 22 through which the left and right eyes, LE and RE, of an observer can perceive a field.

The rangefinder-viewfinder 16 includes cooperating rangefinding means and viewfinding means. The rangefinding means is illustrated as including a range reticle 24 and a pair of spaced Fresnel lens sections 26a, 26b representing fragments of catoptric Fresnel lens 26. The lens 26 and reticle 24 will be described in detail below. The terms "Fresnel lens," "Fresnel lens means," or the like are intended to be construed in a broad sense as encompassing all optical devices, both dioptric and catoptric, which employ one or more Fresnel image-forming surfaces.

A planar relay mirror 30 creates a virtual image of the range reticle 24 which is predetermined to be at most a focal length away from the Fresnel lens 26. The lens 26 projects a second virtual image of this range reticle image into the viewed field. With the mirror 30 at the location shown in unbroken lines, the virtual image of the range reticle 24 produced by the mirror 30 is illustrated as being substantially at the focal plane of the lens 26, causing the projected reticle image to appear at infinity. With the mirror 30 moved toward the scene to a second position shown in broken lines at 32, the virtual image 34 of the range reticle 24 would be positioned in the field at a predetermined finite distance from the observer. As described and claimed in the above-referenced copending application, the reticle image 34 is viewed stereoscopically and will appear as a three-dimensional image situated in a three-dimensional field.

Coupling means for coupling the rangefinding means to the focus control means is shown schematically as taking the form of a bar 36 being connected at one end to mirror 30 and having its opposite end received in a spiral groove 38 in lens turret 12. The coupling means effects translation of the planar mirror 30 as the lens turret 12 is rotated, and is so constructed and arranged that adjustment of the turret 12 until the image 34 of the reticle 24 appears to lie in the vicinity of an object to be photographed causes the objective lens 10 to be focused on that object.

The construction of the Fresnel lens 26 according to this invention will now be described in detail. Referring particularly to FIG. 2, the Fresnel lens sections 26a, 26b which constitute lens 26 are illustrated as being formed in a lens plate 40. The lens plate 40 is preferably formed from a transparent optical quality plastic such as acrylic. The lens plate 40 has plane parallel front and rear surfaces except in the areas wherein Fresnel lens sections 26a, 26b are situated. In these areas the lens plate 40 is formed so as to have an intaglio taking the configuration of the desired Fresnel imaging surface. The areas in intaglio are then partially mirrorized (e.g., by deposition of aluminum or silver) to create partially reflective coatings 41a, 41b. The areas in intaglio are then filled with the same plastic material, or another suitable optical quality material having substantially the same index of refraction as that of the plate 40. By this construction there is created a partially reflective catoptric Fresnel lens 26, comprising lens sections 26a, 26b, which is encapsulated within the lens plate 40.

The range reticle 24 may be fabricated in a manner similar to that described above. An area 42 on the plate 40 at the location of the range reticle 24 is caused to define in intaglio the negative of the desired reticle configuration, here shown as an arrow head. In the area 42 is deposited an opaque filling material 43 which acts to define the reticle configuration. The reticle configuration will appear bright against the black surround thus created. The surface 44 of the window thus formed is preferably frosted or lenticulated or otherwise caused to be light scattering in order to destroy any background detail which otherwise might appear in the reticle image 34. A color filter (not shown) registered with the window may be used to minimize dispersion of image 34 due to chromatic aberration in lens 26.

The viewfinding means is illustrated as comprising a frame reticle 45 defined by four corner elements 46, 47, 48, and 49. In the illustrated embodiment the frame reticle 45 is illuminated by ambient light passing through the lens plate 40; however, other means may be employed to illuminate the reticle 45 with natural or artifical light.

A second catoptric Fresnel lens 50 is employed for projecting a virtual image 51 of the frame reticle 45 substantially to infinity. The Fresnel lens 50 is illustrated as comprising four sections 52, 54, 56, and 58. FIG. 3 is a sectional view through Fresnel lens sections 52, 54. The lens sections 52, 54, 56, 58 which constitute lens 50 each comprise partially reflective coatings, as shown for example at 60, 61, encapsulated within the lens plate 40. The lens sections 52, 54, 56, 58 may be fabricated by the same technique and at the same time as the lens sections 26a, 26b which constitute the Fresnel lens 26. The Fresnel lens 50 has a focal length substantially equal to or slightly greater than the spacing between the lens plate 40 and the frame reticle 45; it is manifest that the Fresnel lens 50 thus has a shorter focal length than lens 26.

Figure 4:
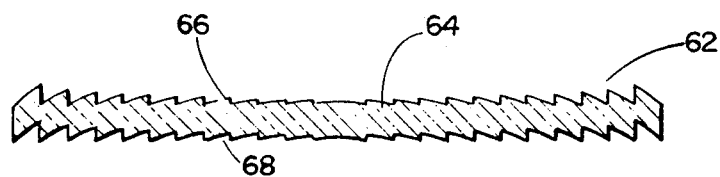
FIGS. 4 and 5 represent alternative embodiments of the catoptric Fresnel imaging means shown in FIGS. 1-3.

FIG. 4 illustrates an alternative catoptric Fresnel lens construction which may be substituted for the constructions of either or both of the Fresnel lenses 26, 50. The Fresnel lenses 26, 50 include a partially mirrorized Fresnel imaging surface encapsulated in a plane parallel plate. This construction has extreme axial compactness, but suffers from chromatic aberration. The FIG. 4 Fresnel lens 62 produces no chromatic aberration and thus, in this respect, represents an improvement on the FIG. 1–3 Fresnel lens construction.

The FIG. 4 Fresnel lens 62 comprises a flat transparent plate 64 having confocal positive and negative Fresnel image-forming front and rear surfaces 66, 68 with equal but opposite imaging effect, causing the plate 64 in transmission to have substantially zero dioptric power. The field will thus appear to an observer at true scale, i.e., without magnification or reduction. The rear surface 68 has disposed thereon a partially reflective coating, thus creating a positive catoptric Fresnel lens.

Plural Fresnel lenses may be formed with different focal lengths in a single lens plate, as shown in FIG. 1, to accomplish the functions of the Fresnel lenses 26, 50 in the FIGS. 1–3 embodiment.

Figure 5:
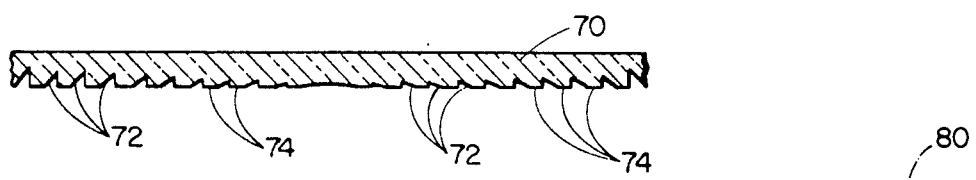

FIG. 5 illustrates yet another Fresnel lens embodiment according to this invention which may be substituted for the Fresnel lens structures shown in FIGS. 1–3 or FIG. 4. The FIG. 5 embodiment is illustrated as comprising a transparent plate 70 having on the rear surface thereof a Fresnel imaging surface. The FIG. 5 Fresnel imaging surface is defined by a concentric array of truncated Fresnel imaging elements 72 intercalated with flat ring-like zones 74 having substantially zero dioptric power. The Fresnel elements 72 are fully reflective, rather than being partially reflective as in each of the afore-described embodiments. The elements 72 cooperate to produce the imaging properties of the FIG. 5 lens, while the zero power zones 74 between the elements 72 provide a simultaneous afocal property of the plate 70. When employed in an application such as a photographic rangefinder or viewfinder, the afocal property of the plate 70 in transmission provides an observer with an unmagnified (or reduced) view of the field, the focal property of the plate 70 providing means for projecting a virtual reticle image into the field. The FIG. 5 embodiment combines the properties of no chromatic aberration and yet extreme axial compactness.

Figure 6:
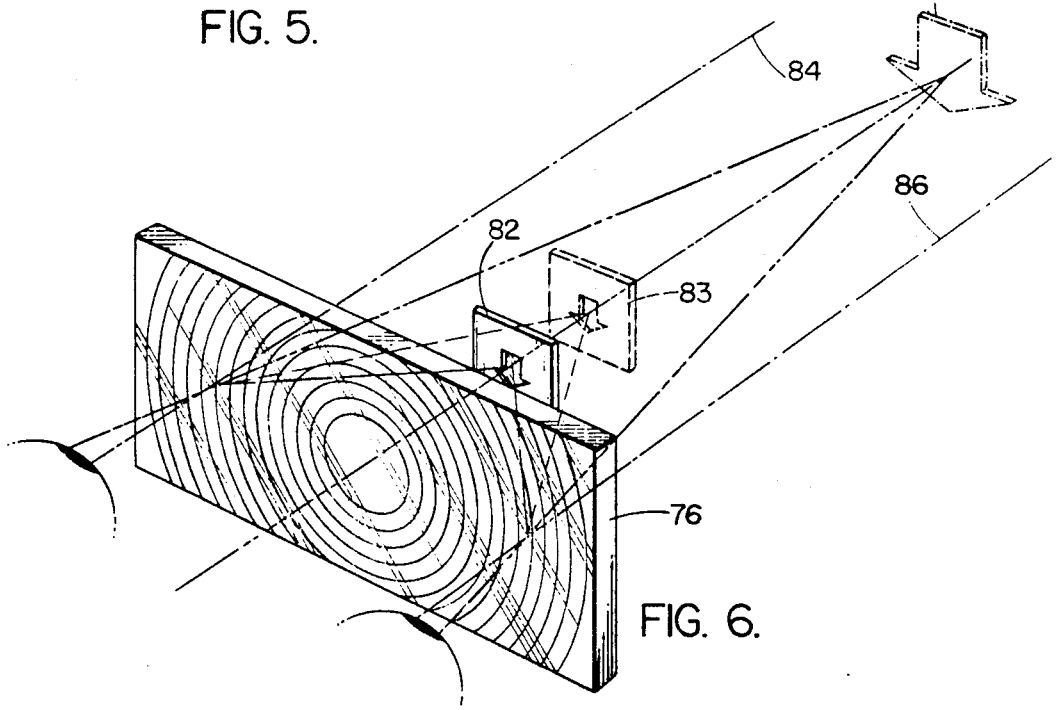
FIG. 6 is a highly schematic perspective view of a rangefinder including a novel dioptric Fresnel lens embodying the principles of this invention.
Figure 7:
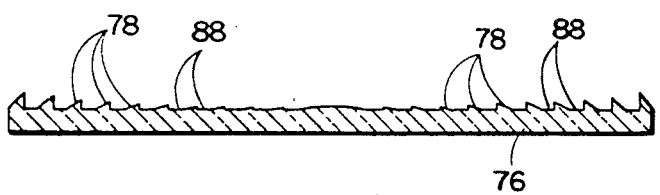
FIG. 7 is an alternative embodiment of the Fresnel imaging means shown in FIG. 6.

FIGS. 6 and 7 illustrate an embodiment of the invention employing a dioptric Fresnel lens constructed according to the teachings of this invention. The FIGS. 6–7 embodiment represents schematically a rangefinder corresponding generally in function and intended use to the rangefinder means in the FIGS. 1–3 embodiment.

A dioptric Fresnel lens plate 76 has, according to this invention, both focal and afocal properties, as will be described in more detail below. Fresnel image-forming elements 78 project into the field an image 80 of a range reticle 82 spaced at most a focal length away from the lens plate 76. The range reticle 82 may take a great variety of constructions. It is here shown by way of example as comprising an opaque mask defining a window, preferably frosted. A color filter may be placed in the window or in registration therewith to suppress dispersion of the reticle image 80 which might result from chromatic aberration produced by the elements 78.

In the position shown in unbroken lines the range reticle 82 is spaced somewhat less than a focal length away from the lens plate 76; in the position 83 shown in broken lines, the range reticle 82 would be spaced substantially a focal length away from the lens plate 76, causing a virtual image of the reticle 82 to be projected substantially to infinity as represented by the parallel light rays 84, 86.

Referring particularly to FIG. 7, the lens plate 76 includes truncated concentric Fresnel elements 78 intercalated with flat ring-like zones 88. The flat zones 88 create areas of zero dioptric power through which light rays from the scene may pass undeviated to the eyes of the observer. Thus, the observer sees simultaneously an image of the reticle 82 against a substantially unmagnified (or reduced) field.

By comparing the FIG. 5 Fresnel lens embodiment with the FIGS. 6-7 lens 76, it can be appreciated that the two embodiments represent catoptric and dioptric implementations of the same inventive concept.

As described above, by this invention novel Fresnel imaging structures have been provided which are especially useful in the construction of photographic rangefinders and viewfinders, or combined rangefinder-viewfinders. This invention is not limited to the particular details of construction of the embodiments depicted and it is contemplated that various and other modifications and applications will occur to those skilled in the art.

For example, the principles of this invention may be employed in a dual reticle stereoscopic rangefinder and in many other optical instruments and apparatus wherein an optical device having both focal and afocal properties is desired. With reference particularly to the coupled rangefinder embodiments (FIGS. 1-3 and FIGS. 6-7), rather than effectively coupling movement of the reticle (e.g. by the use of plane mirror 30 in the FIGS. 1-3 embodiment) to focus adjustments of the objective lens 10, the lens plate 40 might instead be moved relative to the reticle. Or a reflective range reticle 24 (FIGS. 1-3 embodiment) might be substituted for the plane mirror 30; this arrangement would, of course, require a much shorter focal length for the Fresnel lens 26 than is the case for the FIGS. 1-3 embodiment.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A partially reflective catoptric Fresnel lens comprising a transparent plate having confocal positive and negative Fresnel image-forming front and rear surfaces with opposite and equal imaging effect such that in transmission said plate has substantially zero dioptric power, said rear surface of said plate having thereon a partially reflective coating.

2. A Fresnel lens comprising:
a dioptric first pattern of Fresnel image-forming elements having a predetermined power; and
a catoptric second pattern of Fresnel image-forming elements, of different power than said first pattern of elements, intercalated with said first pattern of elements.

* * * * *